(12) United States Patent
Chouksey et al.

(10) Patent No.: US 7,934,000 B2
(45) Date of Patent: Apr. 26, 2011

(54) REAL-TIME COMMUNICATION USING INTER-PROCESS COMMUNICATIONS

(75) Inventors: Sanjay Chouksey, Santa Clara, CA (US); Bhanu Sharma, San Bruno, CA (US)

(73) Assignee: Adobe Systems Incorporated, San Jose, CA (US)

( * ) Notice: Subject to any disclaimer, the term of this patent is extended or adjusted under 35 U.S.C. 154(b) by 764 days.

(21) Appl. No.: 11/611,019

(22) Filed: Dec. 14, 2006

(65) Prior Publication Data
US 2008/0144603 A1 Jun. 19, 2008

(51) Int. Cl.
*G06F 15/16* (2006.01)

(52) U.S. Cl. ........ 709/227; 709/237; 709/205; 709/204; 709/231; 709/217; 709/246; 709/219; 709/203; 709/224; 370/229; 370/401; 370/260

(58) Field of Classification Search .................. 709/227, 709/230, 237, 205, 204, 231, 217, 246, 219, 709/203, 224, 232, 223, 236; 370/352
See application file for complete search history.

(56) References Cited

U.S. PATENT DOCUMENTS

| | | | |
|---|---|---|---|
| 6,789,120 B1 | 9/2004 | Lee et al. | |
| 6,985,478 B2 | 1/2006 | Pogossiants et al. | |
| 7,003,463 B1 | 2/2006 | Maes et al. | |
| 7,065,070 B1 | 6/2006 | Chang | |
| 7,095,733 B1 | 8/2006 | Yarlagadda et al. | |
| 2003/0097661 A1* | 5/2003 | Li et al. | 725/109 |
| 2006/0265508 A1* | 11/2006 | Angel et al. | 709/230 |
| 2008/0144603 A1 | 6/2008 | Chouksey | |
| 2008/0144604 A1 | 6/2008 | Sharma | |
| 2009/0113389 A1* | 4/2009 | Ergo et al. | 717/120 |

OTHER PUBLICATIONS

Macromedia FLASH Media Server 2 Client-Side ActionScript Language Reference for Flash Media Server 2, (available at http://download.macromedia.com/pub/documentation/en/flashmediaserver2/flashmediaserver_cs_asd.pdf) (last accessed Dec. 14, 2006).
Macromedia FLASH Media Server 2 Server-Side ActionScript Language Reference, (available at http://download.macromedia.com/pub/documentation/en/flashmediaserver/2/flashmediaserver_ss_asd.pdf) (last accessed Dec. 14, 2006).
Macromedia Breeze, Breeze Integration Guide, (available at http://download/macromedia.com/pub/documentation/en/breeze/5/brze5_integration.pdf) (last accessed Dec. 14, 2006).
Macromedia Breeze, Breeze Meeting User Guide for Meeting Hosts and Presenters, (available at http://download.macromedia.com/pub/documentation/en/breeze/5/meeting_ug_presenters.pdf) (last accessed Dec. 14, 2006).
U.S. Appl. No. 11/611,046, filed Dec. 14, 2006.
U.S. Appl. No. 12/038,656, filed Feb. 27, 2008.
U.S. Appl. No. 12/239,672, filed Sep. 26, 2008.

(Continued)

*Primary Examiner* — Jude J Jean Gilles
(74) *Attorney, Agent, or Firm* — Kilpatrick Townsend & Stockton LLP

(57) ABSTRACT

A system for providing communication over a network comprises a communication unit included in a user-interactive application, wherein the communication unit is adapted to establish real-time communications with a remote destination, and a media streaming unit adapted to run outside of a program that is executing the user-interactive application. The media streaming unit further adapted to stream real-time communication to and from the remote destination, wherein the communication unit is adapted to control the media streaming unit via an Inter-Process Communication (IPC) mechanism.

21 Claims, 4 Drawing Sheets

OTHER PUBLICATIONS

Conaito VoIP Standard SDK, http://web.archive.org/web/20061125011713/www.conaito.com/voip_standard_ueberblick.asp, archived Nov. 25, 2006 and retrieved May 17, 2010.

CounterPath. eyeBeam 1.11 User Guide, http://web.archive.org/web/20051215115317/www.counterpath.com/docs/eyeBeam1.11UserGuide.pdf, archived Dec. 15, 2005 and retrieved May 14, 2010.

Definition of SDK, http://searchcio-midmarket.techtarget.com/sDefinition/0,,sid183_gci213603,00.html, updated Sep. 27, 2005 retrieved May 17, 2010.

EyeBeam Software Development Kit (SDK) http://web.archive.org/web/20051217093310/www.counterpath.com/index.php?menu=eyeBeamSDK, archived Dec. 17, 2005 linked to eyeBeam SDK Product Specification, http://web.archive.org/web/20051205013738/www.counterpath.com/docs/eyebeam.pdf, archived Dec. 5, 2005, both retrieved May 14, 2010.

Office Action dated May 21, 2010 in U.S. Appl. No. 11/611,046.

Contact At Once!, webpage; archived Jun. 16, 2006; retrieved Oct. 28, 2010, 3 pages.

FierceVoIP, Can VoIP save social networking?; Oct. 19, 2006; retrieved Oct. 27, 2010, 2 pages.

MozIAX; moziax.mozdev.org; archived Oct. 5, 2006; retrieved Oct. 26, 2010, 2 pages.

Uyless Black; Voice Over IP; Publisher: Prentice Hall, Aug. 4, 1999, 328 pages, excerpt 11 pages.

Arrington, Michael, Ether pay-per-call launches for public use; Jun. 22, 2006; retrieved Oct. 27, 2010, 3 pages.

FierceVoIP.com, Jaxtr social network VoIP tool bows: Do you care?; Dec. 14, 2006, 2 pages.

Gonzalez, Nick; Wengo Video Chat for Bloggers; Dec. 21, 2006; retrieved Oct. 27, 2010, 3 pages.

Keating, Tom, Wengo releases Flash VoIP client; Dec. 18, 2006; retrieved Oct. 27, 2010, 6 pages.

Luca Filigheddu, Firefox VoIP: Abbeynet; Jun. 6, 2006; retrieved Oct. 27, 2010, 14 pages.

Malik, Om, Flash in the VoIP Pan; Sep. 22, 2006; retrieved Oct. 27, 2010, 8 pages.

Vanderveer, Flash 8: The Missing Manual; Publisher: O'Reilly Media, Inc., Mar. 22, 2006, 464 pages, excerpt 6 pages.

Wengo Visio, translated blog post http://www.genbeta.com/web/wengo-visio-videoconferencias-para-tu-web-mediante-unwidget; Dec. 11, 2006, Retrieved Oct. 27, 2010; 9 pages.

Office Action dated Nov. 15, 2010 in U.S. Appl. No. 11/611,046.

* cited by examiner

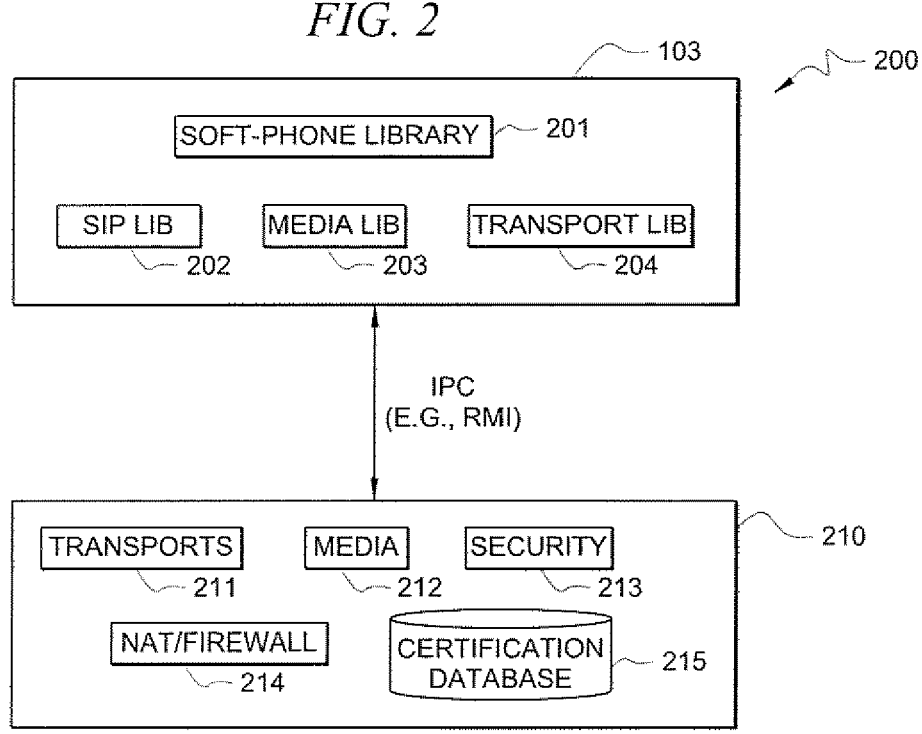
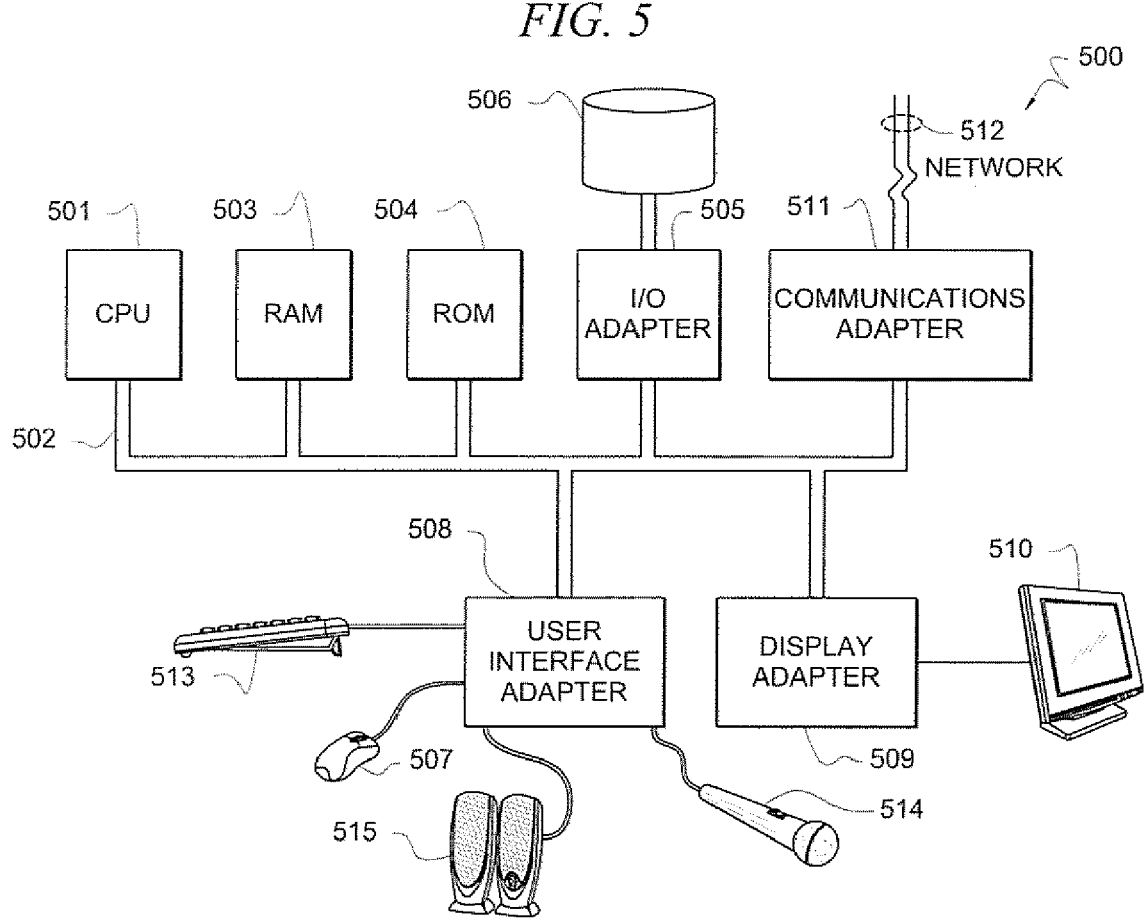

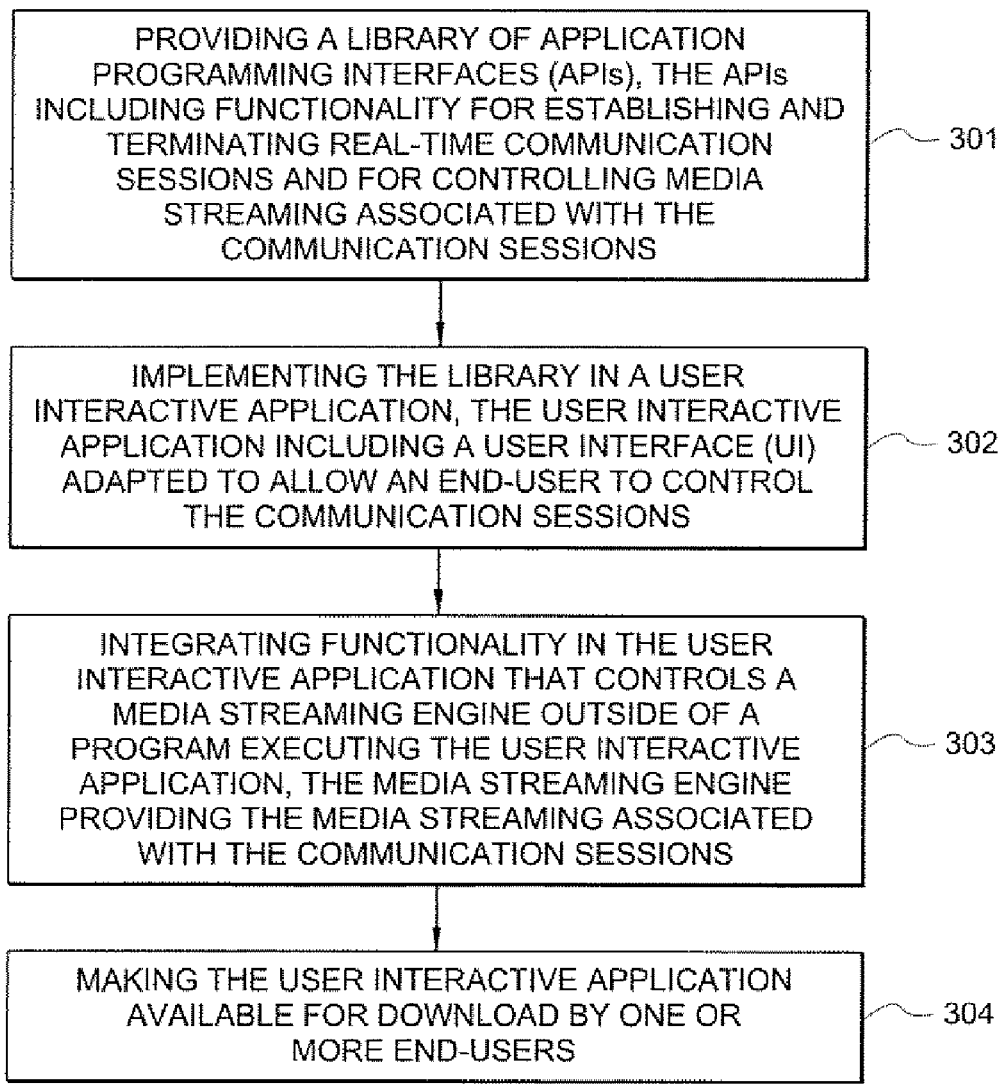

REAL-TIME COMMUNICATION USING INTER-PROCESS COMMUNICATIONS

CROSS-REFERENCE TO RELATED APPLICATIONS

This application is related to commonly-assigned and concurrently filed U.S. application Ser. No. 11/611,046, entitled "INTERFACE-NEUTRAL COMMUNICATION ARCHITECTURE," the disclosure of which is hereby incorporated herein by reference.

TECHNICAL FIELD

This description relates, in general, to real-time voice communication and, specifically, to the architectures and implementation of real-time voice communication techniques.

BACKGROUND OF THE INVENTION

Recently Voice Over Internet Protocol (VoIP) phone service has become popular with consumers, with more people and businesses choosing to migrate to it and away from traditional Plain Old Telephone Service (POTS) every year. VoIP service is a telephone service that uses the Internet to make telephone calls, usually for a fixed fee and a very low per-minute charge, even for some international calls. VoIP systems can be either hardware-based, with special telephone sets or adapters for regular phones in communication with a network router, or software-based, thereby allowing a user to employ a personal computer as a telephone.

Software-based VoIP phones are sometimes referred to as "softphones," and they vary from service to service. Attention has recently been focused on providing softphone functionality in web browser plug-ins. In another example, a stand-alone program is used to support VoIP communication. This can make softphone functionality difficult for developers of web pages and Rich Internet Applications (RIAs) to leverage, since a developer who desires to implement phone technology in an application will generally have to rely on the functionality provided by a web browser plug-in or other program with little flexibility for User Interface (UI) concerns or application-specific concerns. Further, since there are different browser plug-ins available, not every application will work with every browser. There is no solution currently on the market that gives developers control over real-time communication functionality and can be nearly universally useable.

BRIEF SUMMARY OF THE INVENTION

The present invention is directed to systems, computer program products, and methods which give developers control over real-time communication by providing techniques to implement communication functionality in end-user applications and also by providing programs that support media streaming and are controlled by the end-user applications.

In one example embodiment, developers can use libraries of Application Program Interlaces (APIs) to implement real-time communication functionality in a user interactive application (e.g., a web page). However, traditional Hypertext Markup Language (HTML) web pages do not generally support real-time data transfer. Accordingly, a media streaming engine is provided that is separate from the web browser and is controlled by the application, and together, a robust, real-time communication framework is provided to end-users.

In one specific example, a user interactive application includes functional units that control set-up and termination of communication sessions, control media streaming, and communicate to a separate media streaming engine through one or more Inter Process Communication (IPC) techniques. The separate media streaming engine receives commands from the user application and sends and receives the communication media stream between the end-user and a remote destination.

In various embodiments of the invention, the user interactive application includes much of the communication functionality. Accordingly, developers can be given freedom to implement the functionality in ways that suit individual applications. Some embodiments provide additional advantages. For instance, by implementing some communication functionality in a media streaming engine that is separate from the program that executes the application, the media streaming engine can be allowed to run even when the application and/or its program are exited. In this way, warm-up of the media streaming engine may not be needed before each communication session.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OFF THE DRAWINGS

For a more complete understanding of the present invention, reference is now made to the following descriptions taken in conjunction with the accompanying drawing, in which:

FIG. 2 is an illustration of an exemplary system adapted according to one embodiment of the invention;

FIG. 3 is an illustration of an exemplary method adapted according to one embodiment of the invention for creating an application with real-time communication capabilities:

FIG. 5 is an illustration of an exemplary computer system adapted according to embodiments of the present invention.

DETAILED DESCRIPTION OF THE INVENTION

Figure 1:
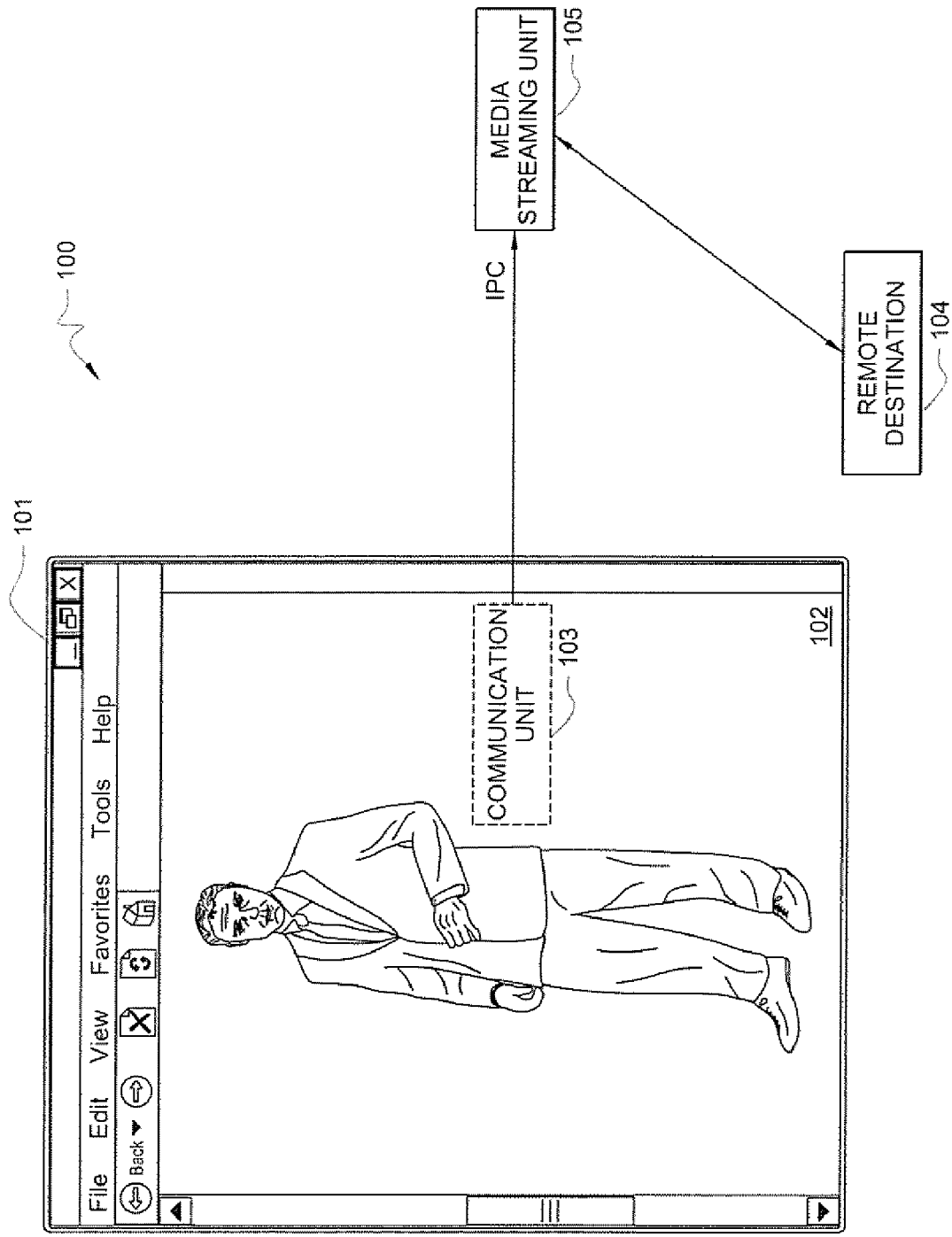
FIG. 1 is an illustration of an exemplary system, adapted according to one embodiment of the invention.

FIG. 1 is an illustration of exemplary system 100, adapted according to one embodiment of the invention. System 100 includes communication unit 103, which is included in user interactive application 102. User interactive application 102 (and by extension, communication unit 103) are executed by program 101.

User interactive application 102 can be any kind of interactive application, including, for example, a World Wide Web page ("web page"), a RIA, or other kind of application. In these examples, a web page is usually based on HTML and may include interactive features provided through use of JAVA, available from Sun Microsystems, JAVASCRIPT™, available from Netscape, ACTIVE X™ controls, available from Microsoft corporation, and the like. RIAs generally make use of graphics, audio, video, and/or animation and often include FLASH®-based content (FLASH® is available from Adobe Systems Incorporated). Program 101 can be any kind of program that is operable to execute user interactive application 103. Examples include web browsers, such as INTERNET EXPLORER™ available from Microsoft Corporation, and media players, such as FLASH PLAYER™ (available as a browser plug-in and as a stand-alone program), available from Adobe Systems Incorporated, and the like.

Communication unit 103 is operable to establish a communication session with remote destination 104. Remote destination 104 may be another user-interactive application, a software-based phone, a hardware-based phone, a computer, and/or any kind of hardware/software combination that is operable to send and receive communications from communication unit 103. In this example, the communication session may include a VoIP call, a voice conference, a voice/video conference, a voice/video/data conference, and/or the like. In one example, establishing a communication session includes using Session Initiation Protocol (SIP) signaling to establish a VoIP call. However, other examples may include other protocols for establishing VoIP calls and, in fact, may use any technique now known or later developed to establish communication sessions, VoIP or otherwise.

Communication unit 103 is also adapted to control media streaming unit 105 through Inter-Process Communications (IPC). Examples of IPC mechanisms are described more fully below. In system 100, media streaming unit 105 is a process separate from communication unit 103 and outside of program 101. Examples of controlling the media streaming include, for example, directing media streaming unit 105 to receive audio data coming from a microphone and to stream that data to a particular network address and also directing media streaming unit 105 to listen to a specific IP address and to deliver the received audio information to speakers.

In some examples, the components of system 100 are entirely software-based; however embodiments of the invention are not so limited. In fact alternative embodiments may be based in hardware or a combination of hardware and software.

FIG. 2 is an illustration of exemplary system 200 adapted according to one embodiment of the invention. System 200 is an example architecture for a real-time VoIP softphone that includes communication unit 103. Communication unit 103 and media streaming engine 210 together constitute a VoIP softphone that is accessible to an end-user through a user interactive application.

In this example, communication unit 103 is deployed to the user in a user interactive application. In one embodiment, the user interactive application can be a web page with a FLASH®-based banner advertisement therein, and communication unit 103 is included in the banner advertisement. When the user selects (e.g., clicks on) the banner advertisement, the selection acts as a command for communication unit 103 to establish a VoIP call to the advertiser. In such an example, the banner advertisement performs at least two functions: 1) as a deployment mechanism for Communication unit 103, and 2) as a User Interface (UI) for communication unit 103.

In the example of FIG. 2, communication unit 103 includes libraries 201-204, which are collections of Application Programming Interfaces (APIs). The APIs are used by the developers of user interactive applications to provide the softphone functionality, as described in concurrently-filed and commonly assigned U.S. patent application Ser. No. 11/611/046, entitled "INTERFACE-NEUTRAL COMMUNICATION ARCHITECTURE."

In this examples SIP library 202 provides a basic implementation of SIP as defined by the Internet Engineering Task Force (IETF) in their Request For Comments 3261. (Some SIP embodiments may include updates and modifications to SIP, as the invention is not limited to any particular SIP version, or to SIP at all.) The APIs therein support the building of SIP signaling applications. This can be accomplished, for example, by defining SIP messages as collections of header records ad multi-part bodies. In embodiments that use protocols other than SIP to establish communication sessions, library 202 may include, additionally or alternatively, APIs that facilitate the use of such other protocols.

Media library 203 supplies logic to control media streaming engine 210 to send and receive real-time streams based on Realtime Iransport Protocol (RTP), thereby establishing voice communication with remote parties. In a basic implementation, it defines the endpoints to communicate by sending network address information to media streaming engine 210. In this example, media library 203 leverages the services of NAT/Firewall library 214 (described further below) to negotiate Network Address Translation (NAT) and Firewalls.

Transport library 204 includes APIs that support transporting information over one or more networks. For instance, protocols that "put the signal on the wire" may include Transmission Control Protocol/Internet Protocol (TCP/IP), User Datagram Protocol (UDP), Transport Layer Security (TLS), and the like. To some extent, the protocols supported by the APIs in library 204 are not specifically for VoIP applications, as many can be used in network communication generally, such as over the Internet. In this example, signaling functions and media engine control functions use the APIs in transport library 204 to communicate over the various networks.

In some embodiments, the APIs support the use of "sockets" for listening and transmitting. For instance, some systems adapted for use with FLASH®-based applications expose an "XMLSocket" primitive that exposes to FLASH® a version of a socket. This allows a FLASH-based application to implement the SIP protocol in ACTIONSCRIPT™ and/or communicate with media streaming engine 210.

Soft-phone library 201 provides high-level APIs for use by developers. In contrast to libraries 202-204 that provide APIs on a very detail-oriented and lower level of abstraction, soft-phone library 201 provides APIs on a higher level of abstraction for ease of use by developers who do not desire to work with protocol-level functions. This distinction is further discussed in concurrently-filed and commonly assigned U.S. patent application Ser. No. 11/611,046, entitled "INTERFACE-NEUTRAL COMMUNICATION ARCHITECTURE."

Media streaming engine 210 sends and receives media streams in real-time between the user and the remote destination by, for example, sending microphone data to a specified network address and listening to a specified network address (the same or different) and delivering the received information to speakers.

In this example, media streaming engine 210 is not included in the user interactive application with communication unit 103. Such an arrangement can be used when the user interactive application is an HTML-based web page that does not support real-time communication. Thus, in some embodiments, while communication unit 103 is deployed to the user when the user downloads the application, media streaming engine 210 may be deployed out of band. In one example, when communication unit 103 is executed it checks for the presence of media streaming engine 210, and if the user's computer does not have media streaming engine 210, then a process is begun to download and run media streaming engine 210. In some embodiments, media streaming engine 210 is downloaded once and works with any of a variety of communication units.

Furthers in some embodiments, media streaming engine 210 is a process that runs in the background and has no UI. In fact, in some examples, it may continue to run even when no communication unit is currently executing or may serve more than one executing communication unit.

A further difference between communication unit 103 and media streaming engine 210 is in the implementation of the two functional units. Since communication unit 103 is usually deployed as part of a user interactive application, it will usually be written or provided in a kind of code that is generally used in user interactive applications. For example, when communication unit 103 is deployed in a FLASH®-based banner advertisement, it is usually written by the developer using ACTIONSCRIPT™ (a scripting language for FLASH®-based applications) and compiled into bytecode before being sent to an end-user.

By contrast, the code used to build media streaming engine 210 can often be chosen without regard to the nature of the user interactive application. In one example, media streaming engine 210 can be based in C, C#, C++, or the like. In fact, any language that can be used to build a media streaming engine can be used to build media streaming engine 210.

In this example, media streaming engine 210 includes functional units 211-215. Transport unit 211 is similar to transport library 204 in that it supports sending and receiving information over one or more networks through use of appropriate protocols. In this embodiment, it all allows UDP, TCP and TLS-based socket connections. Additionally or alternatively, it can support to JAVA™ sockets, .NET sockets, XML-Sockets (for FLASH®-based applications), and/or the like. Various embodiment may support any transport protocol now known or later developed.

Media stack 212 provides digital signal processing on the media stream. For instance, in the present VoIP example, media stack 212 provides one or more voice codecs. In other embodiments media stack 212 may also include one or more video codecs. Examples of types of codecs currently available for media streaming include ISAC™ from Global IP Sound, a high-quality codec, standard codecs (e.g., G.711 G.729 standards from International Telecommunication Union), and open source codecs (e.g., ILBC™ from Global IP Sound). Other types of speech signal processing functionality that may be included are Acoustic Echo Cancellation (AEC), noise suppression, Automatic Cain Control (AGC), and the like. When a media stream is established, the endpoints oftentimes negotiate codecs to ensure that both are using the same codec. Codec negotiating can be performed by functional units in communication engine 103 or in media streaming engine 210.

Security module 213 supports one or more security techniques. For example, security module 213 may provide a local Public-Key Infrastructure (PKI). Security module 213 may also help to provide secure voice communication using TLS and/or other security protocols. Further, similar functionality can be included in communication unit 103 to be employed in decrypting Secure Multipurpose Internet Mail Extension (MIME) message bodies in SIP messages.

Certification database 215 is related to security module 213. In this example, certification database 213 stores digital certificates that can be used to identify and/or verify one or more communicating parties.

NAT/Firewall module 214 provides for detection and traversal of various NAT schemes and firewalls. In this example, NAT/Firewall module 214 can provide implementations of Simple Traversal of UDP through NAT (STUN), Traversal Using Relay NAT (TURN) and Interactive Connectivity Establishment (ICE). In addition, especially under restrictive network environments, NAT/Firewall module 214 can also be adapted to handle tunneling through TCP/IP protocols.

In embodiments wherein media streaming engine 210 continues to run even after the user interactive application has exited, NAT/Firewall module 214 can help in collecting IP bindings. The binding information can then be sent to communication engine 103 before the next call is set up. This may facilitate quicker call setups by reducing the number of bindings that are discovered at the time of call setup. Such a feature may also help in ICE negotiation because at least a partial list of bindings is readily available.

FIG. 2 shows communication unit 103 and media streaming engine 210 communicating via an IPC. In some embodiments that use JAVA™ objects, Remote Method Invocation (RMI) may be the particular IPC that is used. However, various embodiments may use different IPCs depending upon the type of user interactive application and the type of media streaming engine that are employed. For instance, in an embodiment that uses a FLASH®-based user interactive application, an appropriate IPC may include XMLSocket (TCP/IP with XML/Text stream). The invention is not limited by type of IPC, as any of a variety of IPC techniques can be used in some embodiments, including but not limited to, shared memory schemes (e.g., LocalConnection in FLASH®), RTMP Protocol (TCP/IP with support for Remote Procedure Calls or RMI in FLASH®), BinarySocket (TCP/IP with binary data in FLASH®), pipes, mailslots, mutually exclusive (Mutex) program tags and the like.

FIG. 2 is an example of a VoIP softphone architecture according to one embodiment of the invention. As mentioned above, various embodiments may use other techniques (e.g., voice/video conferencing) besides VoIP to provide real-time, two way communication. Further embodiments that use VoIP are not necessarily limited to system 200. For example, various softphone embodiments can use the H.323 standard rather than SIP and may, therefore, use a different signaling functional unit.

FIG. 3 is an illustration of exemplary method 300 adapted according to one embodiment of the invention for creating an application with real-time communication capabilities. Method 300 may be performed, for example, by a developer of a user interactive application when he or she is building the application. In step 301, a library of Application Programming Interfaces (APIs) is provided, the APIs including functionality for establishing and terminating real-time communication sessions and for controlling media streaming associated with the communication sessions.

In step 302, the library is implemented in a user interactive application, the user interactive application including a User Interface (UI) adapted to allow an end-user to control the communication sessions. This can be performed, for example, when a developer writes function calls in the source code of the user interactive application that, in effect, create a communication unit when the application is opened or executed by a user's computer.

In step 303, functionality is integrated in the user interactive application that controls a media streaming engine outside of a program executing the user interactive application, the media streaming engine providing the media streaming associated with the communication sessions. In some embodiments, this includes implementing functional units in the user interactive application that communicate with a media streaming engine through IPC mechanisms.

In step 304, the user interactive application is made available for download by one or more end-users. For example, the developer may upload the application to a server computer on a network, where end-users can select it, download it, and execute it.

Method 300 is exemplary, as other methods according to various embodiments of the invention may add, omit, or change the order of steps performed. For example, steps 302 and 303 may be performed together, such as when the library of APIs provides the functionality to control the media streaming engine.

Figure 4:
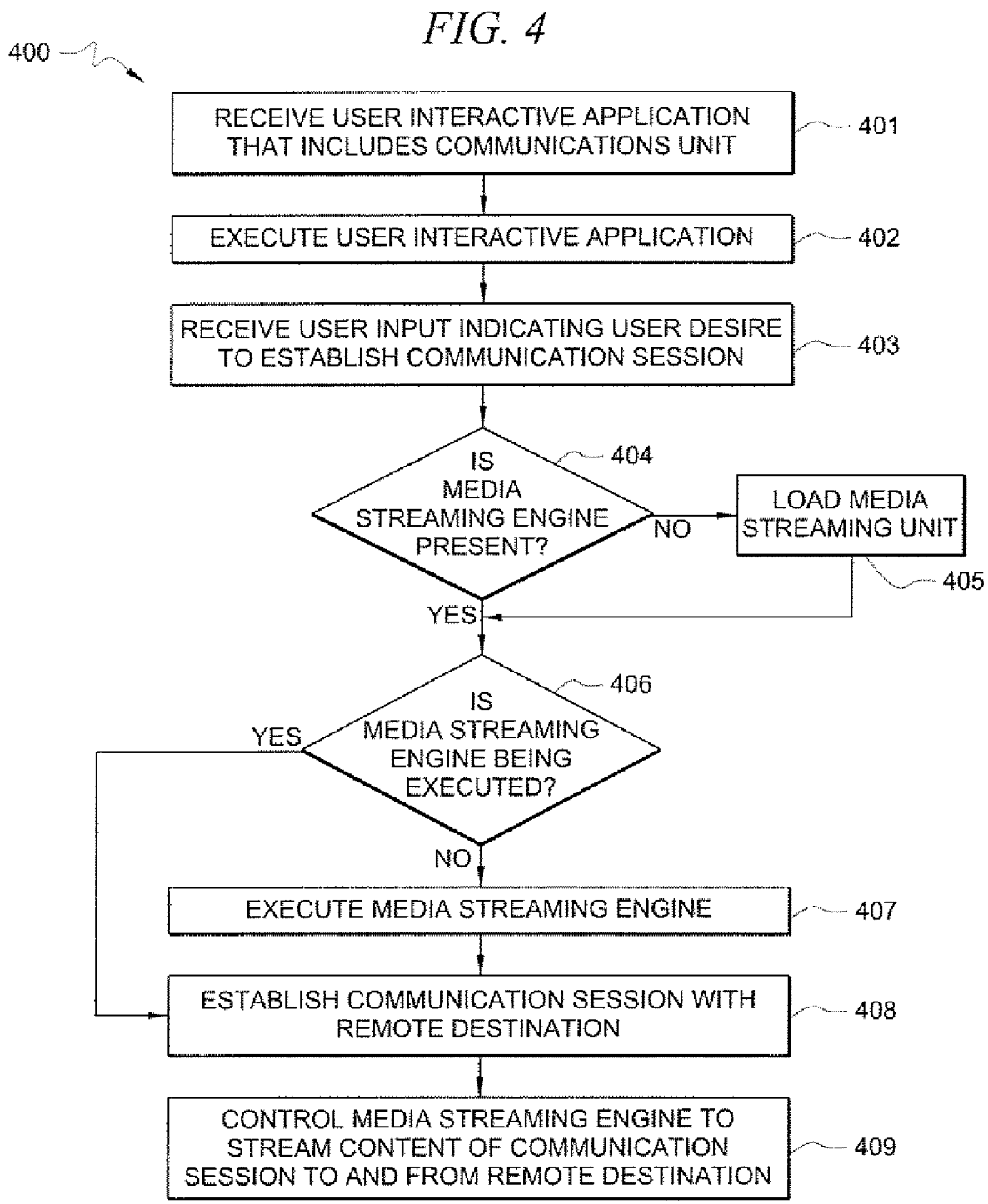
FIG. 4 is an illustration of an exemplary method adapted according to one embodiment of the invention.

FIG. 4 is an illustration of exemplary method 400 adapted according to one embodiment of the invention. Method 400 may be performed, for example, by an end-user operating a processor-based device (e.g., personal computer, cell phone, Personal Digital Assistant (PDA), and the like). In step 401, a user interactive application is received, for example, by downloading from the Internet, Local Area Network (LAN) Wide Area Network (WAN), or other network. In one example, the application is an HTML-based web page with a FLASH®-based banner advertisement therein, and the banner advertisement may be from the same or a different network or server as the other application content. The user interactive application includes a communication unit, such as, for example, unit 103 of FIG. 1.

In step 402, the user-interactive application is executed, for example, by a web browser, media player, or other such program that is capable of running interactive applications.

In step 403, the application receives user input indicating, a user desire to establish a communication session. In one example, the user selects an interface feature (e.g., a button or the like) that instructs the communication unit to establish the communication session.

In step 404, the communication unit checks if a media streaming engine (e.g., engine 210 of FIG. 2) is present. If not, the media streaming engine is loaded (step 405) onto the user's machine or another machine wherein communication between the communication unit and the media streaming engine can be accomplished. Steps 404 and 405 may be carried out, in one example, by checking if the media streaming engine is loaded onto a user's machine, and if not, directing the user to a network site where the media streaming engine can be downloaded.

In step 406, the communication unit checks if the media streaming engine is currently running. If not, execution of the media streaming engine begins at step 407.

In step 408, the communication session is established between the user and a remote destination. In one example, the communication unit uses SIP signaling to establish a VoIP communication session. It is possible in some embodiments that the communication unit itself can send the SIP signals over the signaling network. It is also possible that the communication unit instructs the media streaming engine to send the SIP signals. In either embodiment, the communication unit controls the setting up and termination of the communication session. As mentioned above, VoIP functionality is one kind of communication that can be supported by embodiments of the invention. Additionally or alternatively, other kinds of communication can be facilitated, such as voice/video/data conferencing, and establishing of communication sessions can be tailored for each type of session, for example, by using protocols appropriate for the session.

In step 409, the media streaming engine is controlled to stream content of the communication session to and from the remote destination. For example, the media streaming engine and communication unit communicate via RMI (or other IPC technique) in some embodiments. Streaming, in these examples, typically involves sending the content in real-time to the remote destination. It can also include receiving and presenting content from the remote destination in real-time.

In this way, an end-user can employ the user interactive application for two-way, real-time communication with a remote destination. Method 400 is exemplary, as other embodiments may add, omit, or rearrange the order of steps.

Embodiments of the invention may include one or more advantages over prior art systems. Prior art systems typically employ stand-alone programs (e.g., Skype, from Skype Technologies) to provide real-time communication or VoIP-dedicated plug-ins for browsers. However, it is difficult for a developer of end-user application to leverage the functionality. This is in contrast to embodiments of the present invention that provide libraries of APIs for a developer to use in implementing real-time communication functions in end-user applications. Once a developer can leverage real-time communication functionality, convenient and end-user-friendly applications and UIs can be developed that encourage use of network-based real-time communication. Such applications and UIs can be developed using, for example, HTML, FLASH®, JAVASCRIP™, and the like. An example of such leveraging is in a customer support web page that allows a customer to select a button that places a call to the customer service center. This can lead to increased end-user/customer satisfaction.

In some embodiments, at least part of a VoIP softphone can be deployed to an end-user through, for example, a web page download. Embodiments of the invention allow for media streaming portions (that are not supported by traditional web pages) to be deployed and executed outside of the end-user application, thereby facilitating the developer's use of real-time communication with traditional web pages.

Since the media streaming engine is separate from the program that executes the application (e.g, a web browser), it is possible in some embodiments to keep the media streaming engine running even after the user exits the application or the application-executing program. This can allow the media streaming engine to be continuously connected to proxy/registrar servers. Advantages of such embodiments call include reducing call setup time, allowing incoming calls when a user has closed a browser, monitoring the network environment so that NAT and firewall information can be fresh (especially when a user moves between networks), and avoiding performing NAT/firewall traversal each time a new communication session is established by retaining fresh NAT/firewall information.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like). In fact, readable media can include any medium that can store or transfer information.

FIG. 5 illustrates exemplary computer system 500 adapted according to embodiments of the present invention. That is, computer system 500 comprises an example system on which embodiments of the present invention may be implemented (e.g., such as a computer used by a developer in creating an application or a computer used by an end user to access and execute an application). Central processing unit (CPU) 501 is coupled to system bus 502. CPU 501 may be any general purpose CPU. However, the present invention is not restricted by the architecture of CPU 501 as long as CPU 501 supports the inventive operations a described herein. CPU 501 may execute the various logical instructions according to embodiments of the present invention.

Computer system 500 also preferably includes random access memory (RAM) 503, which may be SRAM, DRAM, SDRAM, or the like. Computer system 500 preferably includes read-only memory (ROM) 504 which may be PROM, EPROM, EEPROM, or the like. RAM 503 and ROM 504 hold user and system data and programs, including, for example, libraries that support real-time voice communication functionality and applications that include such libraries.

Computer system 500 also preferably includes input/output (I/O) adapter 505, communications adapter 511, user interface adapter 508, and display adapter 509. I/O adapter 505, user interface adapter 508, and/or communications adapter 511 may, in certain embodiments, enable a user to interact with computer system 500 in order to input information, such as voice and video data, as with microphone 514 and a camera (not shown). In addition, it may allow for the output of data, as with speakers 515.

I/O adapter 505 preferably connects to storage device(s) 506, such as one or more of hard drive, compact disc (CD) drive, floppy disk drive, tape drive, etc. to computer system 500. The storage devices may be utilized when RAM 503 is insufficient for the memory requirements associated with storing data for applications. Communications adapter 511 is preferably adapted to couple computer system 500 to network 512 (for example, the Internet, a Local Area Network (LAN), Wide Area Network (WAN), Public Switched Telephone Network (PSTN), cellular network, and the like). User interface adapter 508 couples user input devices, such as keyboard 513, pointing device 507, and microphone 514 and/or output devices, such as speaker(s) 515 to computer system 500. Display adapter 509 is driven by CPU 501 to control the display on display device 510 to, for example, display the user interface (such as in an end-user application) of embodiments of the present invention.

It shall be appreciated that the present invention is not limited to the architecture of system 500. For example, any suitable processor-based device may be utilized, including without limitation personal computers, laptop computers, handheld computing devices, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for providing communication over a network, said system comprising:
   a communication unit included in a user-interactive application, the interactive application comprising a web page that provides interactive features, wherein said communication unit is adapted to establish real-time communications with a remote destination; and
   a media streaming unit adapted to run on a computer executing said user-interactive application, wherein said media streaming unit is outside of a web browser that is executing said user-interactive application on said computer, said media streaming unit further adapted to stream real-time communication to and from said remote destination over the network to provide a two-way voice, voice/video, or voice/video/data conference,
   wherein said communication unit is adapted to control establishing the real time communications through said media streaming unit via an Inter-Process Communication (IPC) mechanism, wherein the communication unit initiates establishing the real time communications in response to a selection of a feature of the interactive features, the selection instructing the communication unit to establish a communication session.

2. The system of claim 1 wherein said IPC mechanism is selected from the list consisting of:
   a Transport Control Protocol/Internet Protocol (TCP/IP) socket;
   shared memory;
   a pipe;
   a mailslot; and
   a mutually exclusive (Mutex) program tag.

3. The system of claim 1 wherein said communication unit comprises:
   a signaling library of Application Programming Interfaces (APIs) for providing telephone signaling functionality; and
   a control library of APIs for providing control over said media streaming unit.

4. The system of claim 1 wherein said media streaming unit comprises:
   a transport library of Application Programming Interfaces (APIs) for providing socket connections to said remote destination;
   a firewall library of APIs for providing detection and traversal of firewalls and Network Address Translation (NAT) systems;
   a media library of APIs for providing voice signal processing functionality; and
   a security library of APIs for providing encrypting and decrypting the media stream between said system and said remote destination.

5. The system of claim 1 wherein said user interactive application comprises a Hypertext Markup Language (HTML)-based Internet application.

6. The system of claim 1 wherein said communication unit and said media streaming unit together provide Voice Over IP (VoIP) functionality.

7. The system of claim 1 wherein said communication unit is adapted to receive user input through a User Interface (UI) in said user-interactive application.

8. A method for supporting two-way communication, said method comprising:

providing a library of Application Programming Interfaces (APIs), said APIs including functionality for establishing and terminating real-time communication sessions and for controlling media streaming associated with said communication sessions;

implementing said library in a user interactive application, said user interactive application including a User Interface (UI) adapted to allow an end-user to control said communication sessions; and integrating functionality in said user interactive application that controls a media streaming engine on a computer executing said user-interactive application, wherein said media streaming engine is outside of a program executing said user interactive application on said computer, said media streaming engine providing said media streaming associated with said communication sessions over a network to provide two-way voice, voice/video, or voice/video/data conferencing.

9. The method of claim 8 further comprising: making said user interactive application available for download by one or more end-users.

10. The method of claim 8 wherein said implementing said library comprises:

writing function calls in one or more source files that make up said user interactive application, said function calls providing said control over said media streaming engine.

11. The method of claim 8 wherein said user interactive application is operable to control the establishing and terminating of Voice over Internet Protocol (VoIP) calls, and wherein said media streaming engine is operable to stream voice data in said communications sessions.

12. The method of claim 8 wherein said library of APIs comprises:

a signaling library of APIs for providing Session Initiation Protocol (SIP) signaling functionality; and a control library of APIs for providing control over said media streaming engine.

13. A non-transitory computer readable medium having computer program logic recorded thereon, said computer logic comprising:

code, when executed by a computer, controlling:

the setting-up and terminating of real-time communication sessions; and the sending and receiving of media streams in said communication sessions, including inter-process communication between a user interactive application and a media streaming engine that is separate from a program executing said user interactive application on said computer and that sends and receives said media streams over a network to provide two-way voice, voice/video, or voice/video/data conferencing;

code, when executed by a computer, receiving user input commands regarding said real-time communication sessions; and code, when executed by said computer, checks for a presence of the media streaming engine on said computer, and, if said computer does not have the media streaming engine, downloads and runs the media streaming engine on said computer.

14. The computer readable medium of claim 13 further comprising:

code, when executed by a computer, verifying that a media streaming engine is not running; and code, when executed by a computer, for beginning the execution of said media streaming engine in response to said verifying.

15. The computer readable medium of claim 13 further comprising:

code, when executed by a computer, receiving commands through said interprocess communication;

code, when executed by a computer, streaming media to a remote destination in response to receiving said commands.

16. The computer readable medium of claim 13, wherein said controlling the setting-up and terminating of real-time communication sessions is operable to establish a Voice over Internet Protocol (VoIP) call.

17. A method for providing two-way communication, said method comprising:

receiving a user interactive application, said user interactive application including computer-executable code using a plurality of Application Programming Interfaces (APIs) for providing functionality for establishing and terminating real-time communication sessions and for controlling media streaming associated with said communication sessions;

executing said user interactive application on a computer; and executing a software-based media streaming engine that is operable to provide said media streaming over a network to provide two-way voice, voice/video, or voice/video/data conferencing and to receive and act upon control commands from said user interactive application regarding said media streaming, wherein said media streaming engine is on said computer and separate from a program used to execute said user interactive application.

18. The method of claim 17 further comprising:

establishing a communication session with a remote destination; and controlling said media streaming engine during said communication session, thereby streaming communication content to and from said remote destination.

19. The method of claim 18 wherein said communication session is a Voice over Internet Protocol (VoIP) call.

20. The method of claim 17 further comprising:

discovering that said media streaming engine is not present on an end-user's machine; and receiving said media streaming engine in response to said discovering.

21. The method of claim 17 further comprising:

discovering that said media streaming engine is not currently executing on an end user's machine; and performing said executing said media streaming engine in response to said discovering.

* * * * *